(12) United States Patent
Liang

(10) Patent No.: US 8,606,660 B2
(45) Date of Patent: Dec. 10, 2013

(54) WAREHOUSE MANAGEMENT SYSTEM FOR AUTOMATICALLY WEIGHING AND COUNTING INDIVIDUAL PARTS

(75) Inventor: Charles Liang, Buffalo Grove, IL (US)

(73) Assignee: Transcell Electronic Scale (Nanjing) Co., Ltd., Jiang Ning Economic & Technical Development Zone, Nanjing, Jiansu Province (CN)

( * ) Notice: Subject to any disclaimer, the term of this patent is extended or adjusted under 35 U.S.C. 154(b) by 425 days.

(21) Appl. No.: 13/110,012

(22) Filed: May 18, 2011

(65) Prior Publication Data

US 2012/0073882 A1    Mar. 29, 2012

(30) Foreign Application Priority Data

Sep. 26, 2010    (CN) .................. 2010 2 0542160 U

(51) Int. Cl.
| | |
|---|---|
| *G06Q 10/00* | (2012.01) |
| *G01G 19/00* | (2006.01) |
| *G01G 23/18* | (2006.01) |
| *G06F 17/40* | (2006.01) |

(52) U.S. Cl.
USPC .... 705/28; 177/25.14; 177/25.17; 177/25.19; 177/145

(58) Field of Classification Search
USPC ............... 177/25.14, 25.17, 25.19, 145, 4; 702/173–175; 705/28, 414
See application file for complete search history.

(56) References Cited

U.S. PATENT DOCUMENTS

| | | | | |
|---|---|---|---|---|
| 4,108,363 | A * | 8/1978 | Susumu ................ | 235/383 |
| 5,883,336 | A * | 3/1999 | Jones .................. | 177/25.17 |
| 6,255,603 | B1 * | 7/2001 | Spannagel et al. ..... | 177/180 |
| 6,541,713 | B2 * | 4/2003 | White ................ | 177/25.16 |
| 6,639,156 | B2 * | 10/2003 | Luke et al. .......... | 177/25.13 |
| 7,361,850 | B2 * | 4/2008 | Timings .............. | 177/1 |
| 7,813,973 | B2 * | 10/2010 | Gudbjartsson ......... | 705/28 |
| 8,468,059 | B2 * | 6/2013 | Enqvist .............. | 705/23 |

* cited by examiner

*Primary Examiner* — Randy W Gibson
(74) *Attorney, Agent, or Firm* — Winston Hsu; Scott Margo

(57) ABSTRACT

A warehouse management system for automatically weighing and counting parts includes a management computer and a weighing device. The management computer communicates with the weighing device. The weighing device includes a base, a tray for carrying a parts bin, and a weighing module. A track is mounted to the base. A roller is mounted on the bottom of the tray and rides on the corresponding track. The tray can move over the track by the roller. The weighing module is attached to one end of the track. The tray together with the parts bin can be actuated to move to the weighing module so as to weigh and count the parts within the parts bin.

18 Claims, 6 Drawing Sheets

WAREHOUSE MANAGEMENT SYSTEM FOR AUTOMATICALLY WEIGHING AND COUNTING INDIVIDUAL PARTS

BACKGROUND OF THE INVENTION

1. Field of the Invention

The invention relates to a product handling apparatus, specifically, to a warehouse management system for automatically weighing and counting parts.

2. Description of the Prior Art

When a client takes a bill of material (BOM) to pick up the desired materials from a warehouse, a warehouse worker looks up each item on the BOM in a computer, locates it, and retrieves the item for the client in the requested quantities. Afterwards, the worker updates the inventory so that an adequate supply of the product may be maintained. Although the aforementioned process looks simple, mistakes related to human error may be made. Once a mistake occurs, the conventional system cannot catch it and easily make the necessary corrections. For example, the worker may take the wrong part, the incorrect quantity, or incorrectly update the inventory. Recently, similar counting systems have been developed to correct this issue. However, the accuracy of the systems cannot be maintained due to long term pressure on the weighing sensor, which can create creep and drift, thereby creating inaccuracies.

SUMMARY OF THE INVENTION

In one embodiment, the present invention provides a warehouse management system for automatically weighing and counting parts. The warehouse management system comprises a management computer and a weighing device. The weighing device is configured to communicate with the management computer. The weighing device comprises a base, a tray, a weighing module, a track, and a roller. The tray is configured to carry a parts bin. The track is mounted on the base. The roller is mounted on a bottom of the tray and corresponding to the track. The tray is capable of moving over the track by way of the roller. The weighing module is attached to one end of the track. When the weighing device is used to weigh the parts, the tray, together with the parts bin, is actuated to move to the weighing module.

In another embodiment, the present invention provides a weighing device comprising a base, a tray, a weighing module, a track, and a roller. The tray is configured to carry a parts bin. The track is mounted on the base. The roller is mounted on a bottom of the tray and corresponding to the track. The tray is capable of moving over the track by way of the roller. The weighing module is attached to one end of the track. When the weighing device is used to weigh the parts, the tray, together with the parts bin, is actuated to move to the weighing module.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
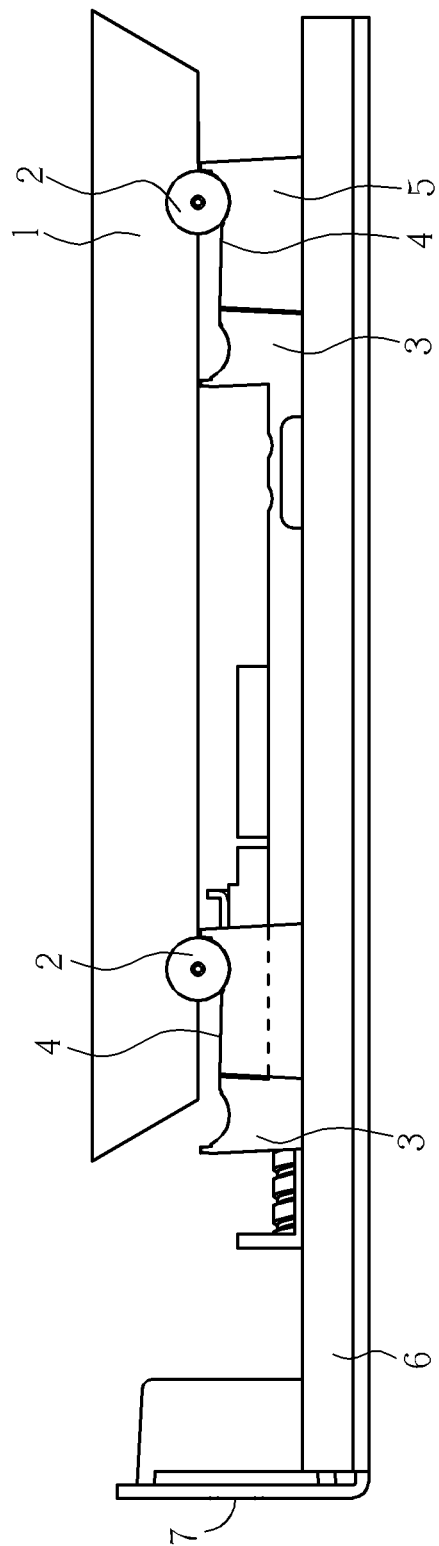
FIG. 1 is a schematic diagram illustrating the principle of the weighing device, which is situated in an idle state, in accordance with one embodiment of the present invention.

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

In some embodiments, a warehouse management system for automatically weighing and counting parts is provided. The warehouse management system comprises a management computer and a weighing device. The management computer communicates with the weighing device. In one embodiment, the weighing device can be comprised of a base, a tray for carrying a parts bin, and a weighing module. A track is mounted to the base and a roller is attached to the bottom of the tray, which rides on the corresponding track. The weighing module is mounted to one end of the track. When a warehouse worker wants to use the weighing device to weigh parts, he has to slide the tray and stop the tray with the parts bin on the weighing module or simply activate the actuating device, as described in more detail below.

In some embodiments, a weighing device is also provided. This weighing device can comprise a base, a tray configured to carry a parts bin, a weighing module, a track mounted on the base, and a roller mounted on a bottom of the tray and corresponding to the track. The tray is capable of moving over the track by way of the roller. The weighing module is attached to one end of the track. When the weighing device is used to weigh the parts, the tray, together with the parts bin, is actuated to move to the weighing module.

In one embodiment, the tray is connected to an actuating device. The actuating device may be a mechanism capable of setting the tray into motion. For example, the actuating device maybe a linear motor, a hydraulic transmission mechanism, or a mechanism including a screw rod connected to a step motor, and so on.

In one embodiment, the actuating device is a mechanism that can be comprised of a screw rod connected to a step motor and a screw nut, which is attached to both the rod and the tray. A rotor of the step motor drives the screw rod to rotate. An axial direction of the screw rod is parallel to the moving direction of the tray.

In one embodiment, the weighing module is comprised of a weighing sensor, a micro-processing unit (MPU), a display unit and a communication unit. Signals outputted by the weighing sensor are amplified, converted from analog to digital, and then transmitted to the MPU. An output of the MPU is connected to the display unit. The MPU exchanges data with the management computer via the communication unit. The communication unit can be hard-wired to the MPU, which then communicates to the management computer either through a hard wire or wirelessly.

The weighing module can have a weight range of anywhere between about 2 kg to about 100 kg, depending on the parts being weighed and the needs of the end user. As used herein, the term "about" means that the specified dimension or parameter may be varied within an acceptable manufacturing tolerance for a given application. In some embodiments, the acceptable manufacturing tolerance is ±10%

The display unit of the weighing module can display the net weight and count of each part. Since each part has been weighed in advance, the quantity of each part stored in the parts bin can be determined by using the gross weight of the bin, minus the weight of the bin itself, divided by the weight of the part and shown on the display unit.

The display unit of the weighing module may utilize red light emitting diodes (LEDs) to show the needed quantities of parts indicated on a bill of materials (BOM). After the worker picks up the needed quantities, the red light will be converted to green light and the display unit shows the remaining quantity of parts in the parts bin.

In one embedment, four rollers can be mounted to the four bottom corners of the tray, respectively. The weighing module is comprised of four weighing sensors in relation to each of the four rollers. Each of the four weighing sensors has a recess in relation to a shape of each of the four rollers.

When the weighing module is used to weigh the needed parts, the weight of the tray and the parts bin act on the weighing sensor. When the weighing sensor is idle, the weight of the tray and the parts bin shift onto a load-bearing base. Therefore, the accuracy of the weighing sensor can be maintained since the weighing sensor is not altered by the continuous weight of the tray and the parts bin over an extended period of time.

As an example, a client hands over a BOM, which may indicate the need for parts including screws, screw nuts, resistors, capacitors, etc., to a warehouse worker. The worker looks up those parts in a computer according to their part numbers, locates them, and records the needed quantities in the computer.

The worker comes to the parts bin, then pushes a tray with the parts bin forward to the weighing sensor of a weighing module for the purpose of weighing and counting. Alternatively, the tray with the parts bin may be pushed to the weighing sensor by a step motor. It should be noted that the weight of each parts bin in the warehouse is known, so the computer can calculate the net weight of the parts in each of the bins after obtaining the gross weight. Furthermore, each part has been weighed so that the unit weight is known and the quantity of parts per parts bin may be calculated. After weighing the parts in the parts bin, the display unit will display the remaining quantities of screws in the parts bin. Since extended pressure on the weighing sensor can cause creep and drift, thereby adversely affect accuracy, embodiments of the present invention utilize a load-bearing base to support the weight of the tray and the parts bin while the weighing sensor is idle. Thus, the weighing device can weigh and count the parts accurately in practical applications over extended periods of time.

There is a weighing module (e.g., parts weighing device) under each tray. The weighing module may communicate with a warehouse management computer by wire or wirelessly. The display unit in front of the weighing module displays the needed quantities of parts on the BOM and the red LED will emit light, so the worker can take the parts according to the displayed quantities.

Once the needed quantities on the BOM have been taken, the red light is converted to green light. At this time, the weighing module also records the remaining quantities. Afterward, the step motor, which may be replaced by a linear motor or a hydraulic transmission mechanism capable of actuating the tray to move, actuates the tray with the parts bin away from the weighing sensor or, alternatively, the worker may push the tray with the parts bin away from the weighing sensor manually. The tray and the parts bin can be supported by the load-bearing base while the weighing sensor is idle, as to possibly prevent creep and preserve the accuracy of the weighing sensor. Also note that the weighing sensor can recalibrate (tare) to a true zero point before each tray and parts bin is weighed.

The weighing module may include a strain gauge type device, an amplifier, an analog to digital converter, an MPU, a display unit, a tray for carrying a parts bin, an actuating device, and so on. Given the quantity and weight range of the different potential parts, the capacity of the weighing module may range from between about 2 kg to about 100 kg. Furthermore, the aforementioned components of different weighing modules may have the same structure as each other or varying structures. Moreover, different weighing modules may have their own trays and parts bins.

In a more detailed example, the BOM is delivered to the warehouse. The display unit displays the remaining quantities of the part, part numbers, and needed quantities. If either too many or too few of the items are taken from the parts bin, an alarm will sound, preventing the error. Moreover, the remaining quantities can be fed back to the enterprise resource planning (ERP) system concurrently. Since the tray and the weighing module can be integrated into one unit, the maintenance and assembly of the invention can be easier. The design of the weighing module can possibly solve errors due to creep, as well as human error, so embodiments of the invention can be both very accurate and practical.

FIG. 1 is a schematic diagram illustrating the principle of the weighing module, which is situated in an idle state, in accordance with one embodiment of the present invention. As shown in FIG. 1, when the weighing device is idle, the rollers 2 of the tray 1 are located on the load-bearing bases 5, respectively, and the weighing sensor 3 is not pressed by any external force.

Figure 2:
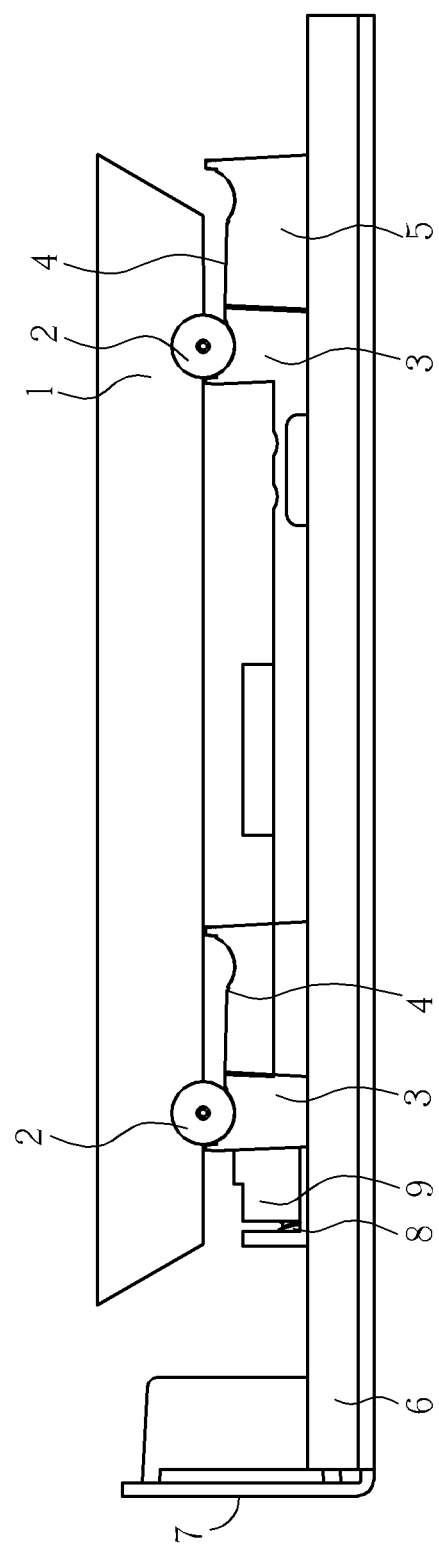
FIG. 2 is a schematic diagram illustrating the principle of the weighing device, which is used to weigh specific parts, and the weighing sensor is engaged in this diagram, in accordance with one embodiment of the present invention.
Figure 3:
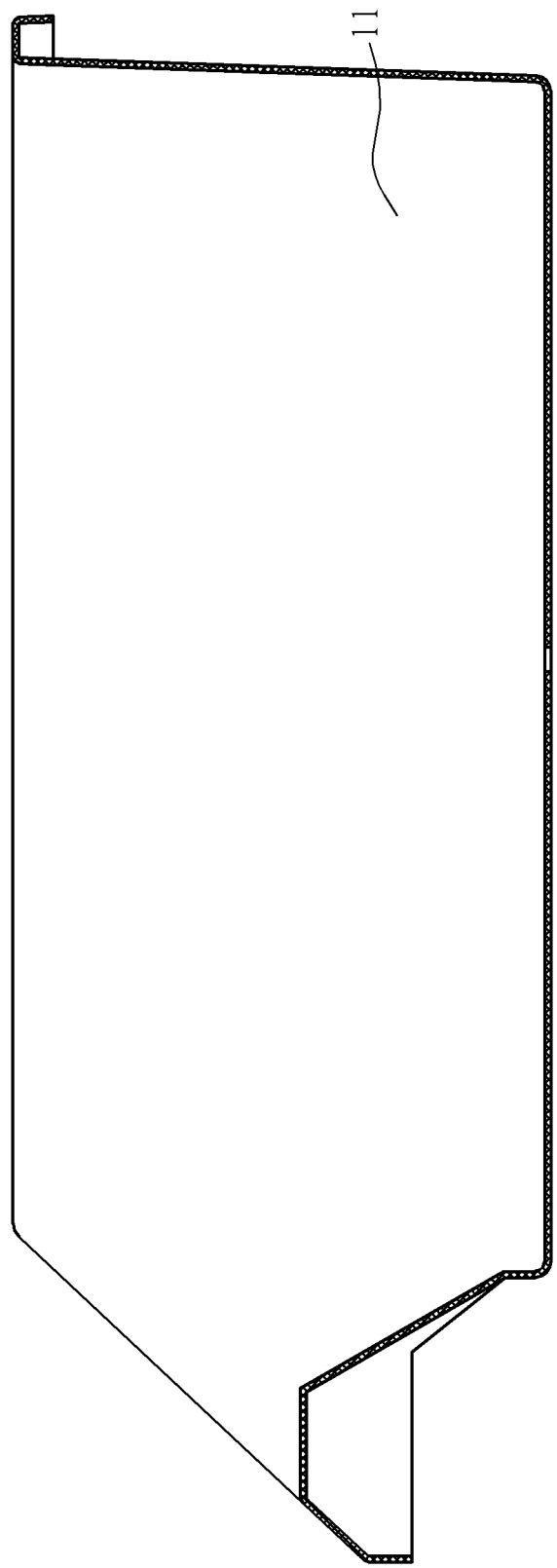
FIG. 3 is a schematic diagram illustrating the parts bin, in accordance with one embodiment of the present invention.

When a worker wants to take some specific parts, he has to come to the front of parts bin 11 and then pulls tray 1 manually or operates step motor 10 to rotate screw rod 8 to drive screw nut 9 to move tray 1, such that the roller 2 of the tray 1 rolls to the recess of the weighing sensor 3. At this time, the weighing sensor 3 receives the weight of parts bin 11 deposited on tray 1. After amplifying and calculating the received weight and subtracting the weight of parts bin 11 from the received weight by the computer, the weight and quantity of the materials stored in the parts bin 11 are displayed on display unit 7. As shown in FIG. 2, the weighing device is engaged in weighing parts.

The worker can take the needed quantities according to the red light shown in display unit 7 of the weighing module. After taking the needed quantities, the red light is converted into green light. Simultaneously, display unit 7 displays the weight and quantity of the parts remaining in parts bin 11.

After taking the desired parts, the worker can push tray 1 with parts bin 11 manually or use the step motor (or other mechanisms capable of generating horizontal displacement) to drive tray 1 with parts bin 11 back to the load-bearing base 5 of the weighing device. At this time, weighing sensor 3 is not pressed by the weight of tray 1 and parts bin 11, and the weighing device is situated in the idle state again, as shown in FIG. 1.

Figure 4:
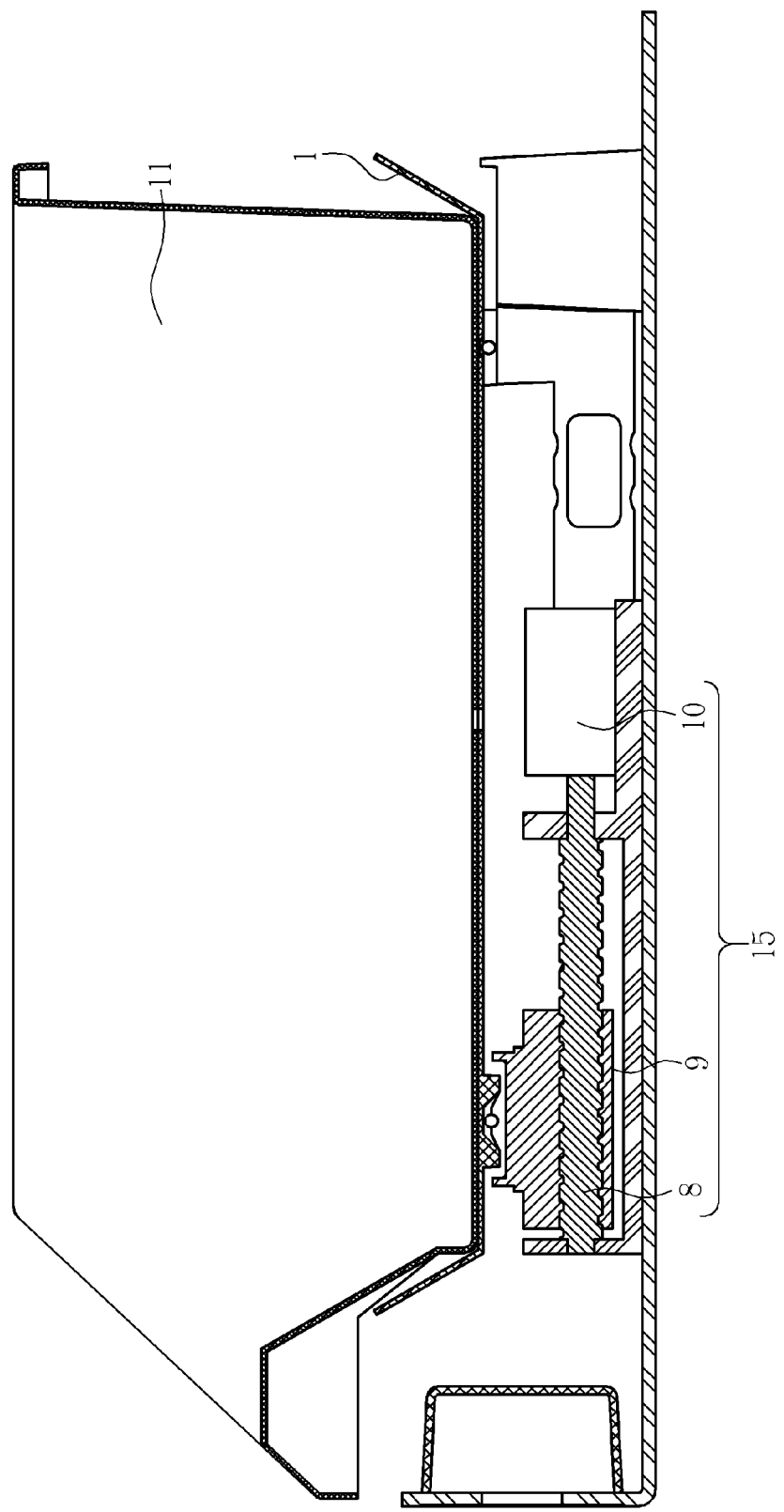
FIG. 4 is a schematic diagram illustrating the principle of the step motor, in accordance with one embodiment of the present invention.

FIG. 4 is a schematic diagram illustrating the principle of the step motor, in accordance with one embodiment of the present invention. As depicted, tray 1 is connected to an actuating device 15. The actuating device 15 may be comprised of a step motor 10, a screw nut 9 and a screw rod 8. A rotor of the step motor 10 can drive the screw rod 8 to rotate. The screw nut 9 is attached to screw rod 8. Tray 1 is connected to screw nut 9. An axial direction of the screw rod 8 is parallel to a moving direction of tray 1.

Figure 5:
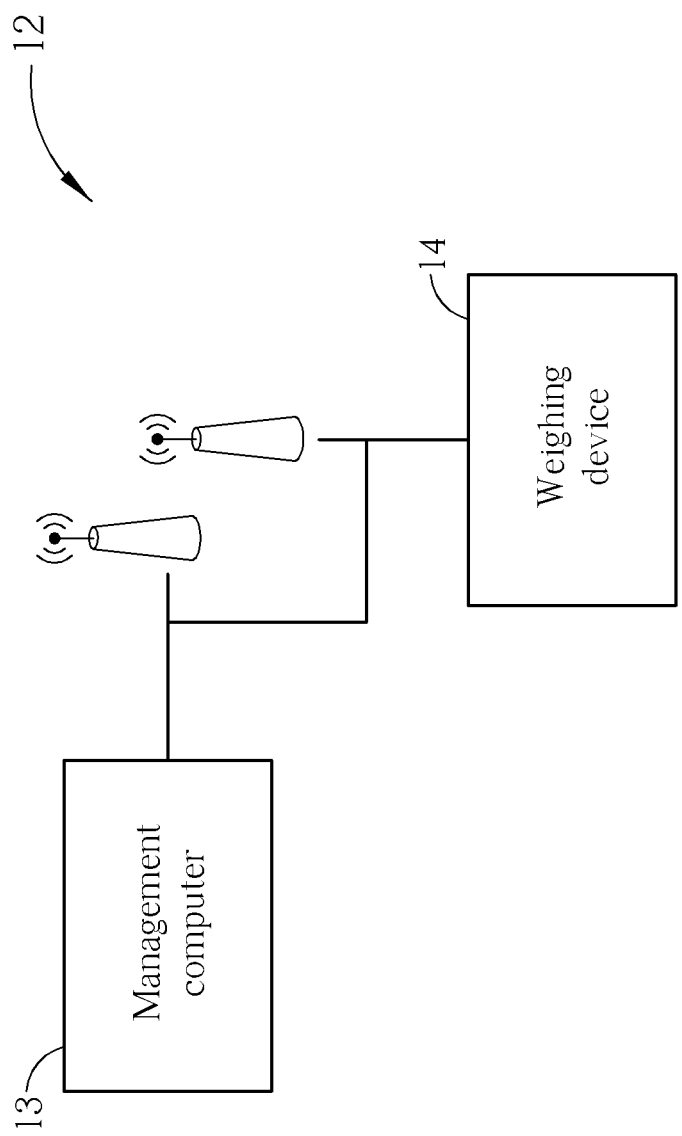
FIG. 5 is a schematic diagram illustrating the warehouse management system for automatically weighing and counting parts according to one embodiment of the present invention.

FIG. 5 is a schematic diagram illustrating the warehouse management system for automatically weighing and counting parts according to one embodiment of the present invention. As depicted, a warehouse management system 12 for automatically weighing and counting parts is comprised of a management computer 13 and a weighing device 14. The management computer 13 can communicate with the weighing device 14.

The weighing device 14 can be comprised of a base 6, a tray 1 for carrying parts bin 11, and a weighing module. Track 4 is mounted on the base 6, and a roller 2 is mounted on the bottom of tray 1 which corresponds to the track 4. Tray 1 together with parts bin 11 is capable of moving over track 4 using roller 2. The weighing module is attached to one end of track 4. When the weighing device 14 is idle, tray 1 is supported by a load-bearing base 5. On the other hand, when the weighing device 14 is used to weigh the needed parts, tray 1 together with the parts bin 11 is actuated to move to the weighing sensor 3.

Figure 6:
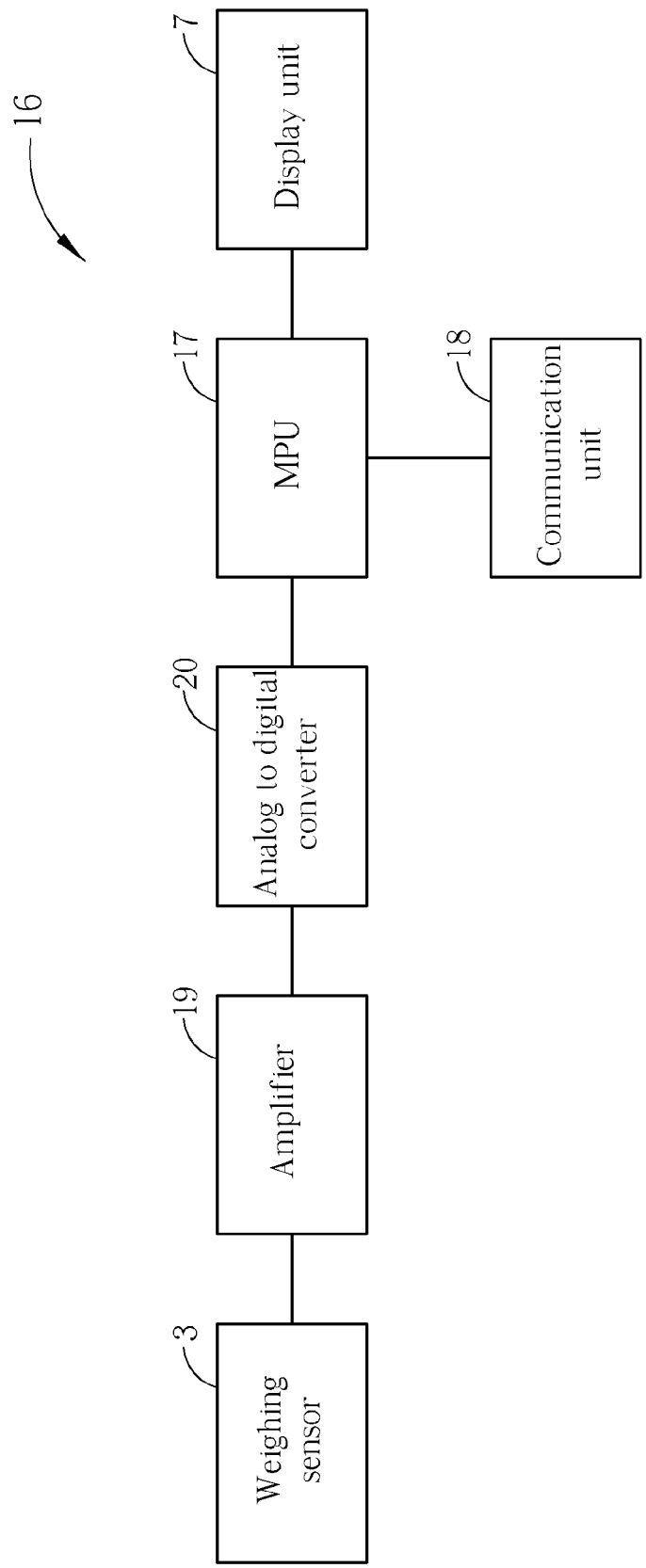
FIG. 6 is a schematic diagram illustrating the weighing module, in accordance with one embodiment of the present invention.

FIG. 6 is a schematic diagram illustrating the weighing module, in accordance with one embodiment of the present invention. As depicted, the weighing module 16 of the invention may comprise a weighing sensor 3, an MPU 17, a display unit 7 and a communication unit 18. The MPU 17 may be a central processing unit (CPU) capable of calculating and processing data. Signals outputted by the weighing sensor 3 are amplified by an amplifier 19, converted by an analog to digital converter 20, and then transmitted to the MPU 17. An output of the MPU 17 is connected to the display unit 7. The MPU 17 exchanges data with the management computer 13 via the communication unit 18.

The communication unit 18 is hard wired to MPU 17. The management computer 13 may receive data via hard wire or wirelessly from the communication unit 18.

In this embodiment, four rollers 2 are mounted on four bottom corners of tray 1, respectively, and the weighing module uses four weighing sensors 3 attached to the base 6 in relation to the four rollers 2. Each of the four weighing sensors 3 has a recess in relation to the shape of each of the four rollers 2.

Those skilled in the art will readily observe that numerous modifications and alterations of the device and method may be made while retaining the teachings of the invention.

What is claimed is:

1. A warehouse management system for automatically weighing and counting parts, the warehouse management system comprising:
   a management computer; and
   a weighing device that is configured to communicate with the management computer, the weighing device comprising:
   a base;
   a tray configured to carry a parts bin;
   a weighing module;
   a track mounted on the base; and
   a roller mounted on a bottom of the tray and corresponding to the track, the tray being capable of moving over the track by way of the roller, the weighing module being attached to one end of the track,
   wherein when the weighing device is used to weigh the parts, the tray, together with the parts bin, is actuated to move to the weighing module.

2. The warehouse management system of claim 1, wherein the tray is connected to an actuating device that is a mechanism capable of actuating the tray.

3. The warehouse management system of claim 2, wherein the actuating device is a mechanism including:
   a step motor that includes a rotor;
   a screw nut connected to the tray; and
   a screw rod connected to the step motor and the screw nut,
   wherein the rotor of the step motor is capable of driving the screw rod to rotate and an axial direction of the screw rod is parallel to a moving direction of the tray.

4. The warehouse management system of claim 2, wherein the actuating device is a hydraulic transmission mechanism.

5. The warehouse management system of claim 1, wherein the weighing module is comprised of a weighing sensor, a micro-processing unit (MPU), a display unit and a communication unit, and wherein signals outputted by the weighing sensor are amplified, converted from analog to digital, and then transmitted to the MPU, an output of the MPU is connected to the display unit, and the MPU exchanges data with the management computer via the communication unit.

6. The warehouse management system of claim 5, wherein a weighing range of the weighing module is between about 2 kg to about 100 kg, and the weighing module and the tray are integrated into one unit.

7. The warehouse management system of claim 5, wherein the communication unit is hard wired to the MPU, and the management computer communicates with the communication unit either via hard wire or wirelessly.

8. The warehouse management system of claim 5, wherein four rollers are mounted on four bottom corners of the tray respectively, the weighing module is comprised of four weighing sensors attached to the base in relation to each of the four rollers, and each of the four weighing sensors has a recess in relation to a shape of each of the four rollers.

9. The warehouse management system of claim 2, wherein the actuating device is a linear motor.

10. A weighing device comprising:
    a base;
    a tray configured to carry a parts bin;
    a weighing module;
    a track mounted on the base; and
    a roller mounted on a bottom of the tray and corresponding to the track, the tray being capable of moving over the track by way of the roller, the weighing module being attached to one end of the track, wherein when the weighing device is used to weigh the parts, the tray, together with the parts bin, is actuated to move to the weighing module.

11. The weighing device of claim 10, wherein the tray is connected to an actuating device that is a mechanism capable of actuating the tray.

12. The weighing device of claim 11, wherein the actuating device is a mechanism including:
- a step motor that includes a rotor;
- a screw nut connected to the tray; and
- a screw rod connected to the step motor and the screw nut, wherein the rotor of the step motor is capable of driving the screw rod to rotate and an axial direction of the screw rod is parallel to a moving direction of the tray.

13. The weighing device of claim 11, wherein the actuating device is a hydraulic transmission mechanism.

14. The weighing device of claim 10, wherein the weighing module is comprised of a weighing sensor, a micro-processing unit (MPU), a display unit and a communication unit, and wherein signals outputted by the weighing sensor are amplified, converted from analog to digital, and then transmitted to the MPU, an output of the MPU is connected to the display unit, and the MPU exchanges data with the management computer via the communication unit.

15. The weighing device of claim 14, wherein a weighing range of the weighing module is between about 2 kg to about 100 kg, and the weighing module and the tray are integrated into one unit.

16. The weighing device of claim 14, wherein the communication unit is hard wired to the MPU, and the management computer communicates with the communication unit either via hard wire or wirelessly.

17. The weighing device of claim 14, wherein four rollers are mounted on four bottom corners of the tray respectively, the weighing module is comprised of four weighing sensors attached to the base in relation to each of the four rollers, and each of the four weighing sensors has a recess in relation to a shape of each of the four rollers.

18. The weighing device of claim 11, wherein the actuating device is a linear motor.

* * * * *